June 19, 1962  M. EAGLE  3,039,357
PHOTOGRAPHIC ASSEMBLY AND APPARATUS THEREFOR
Filed March 11, 1957  2 Sheets-Sheet 1
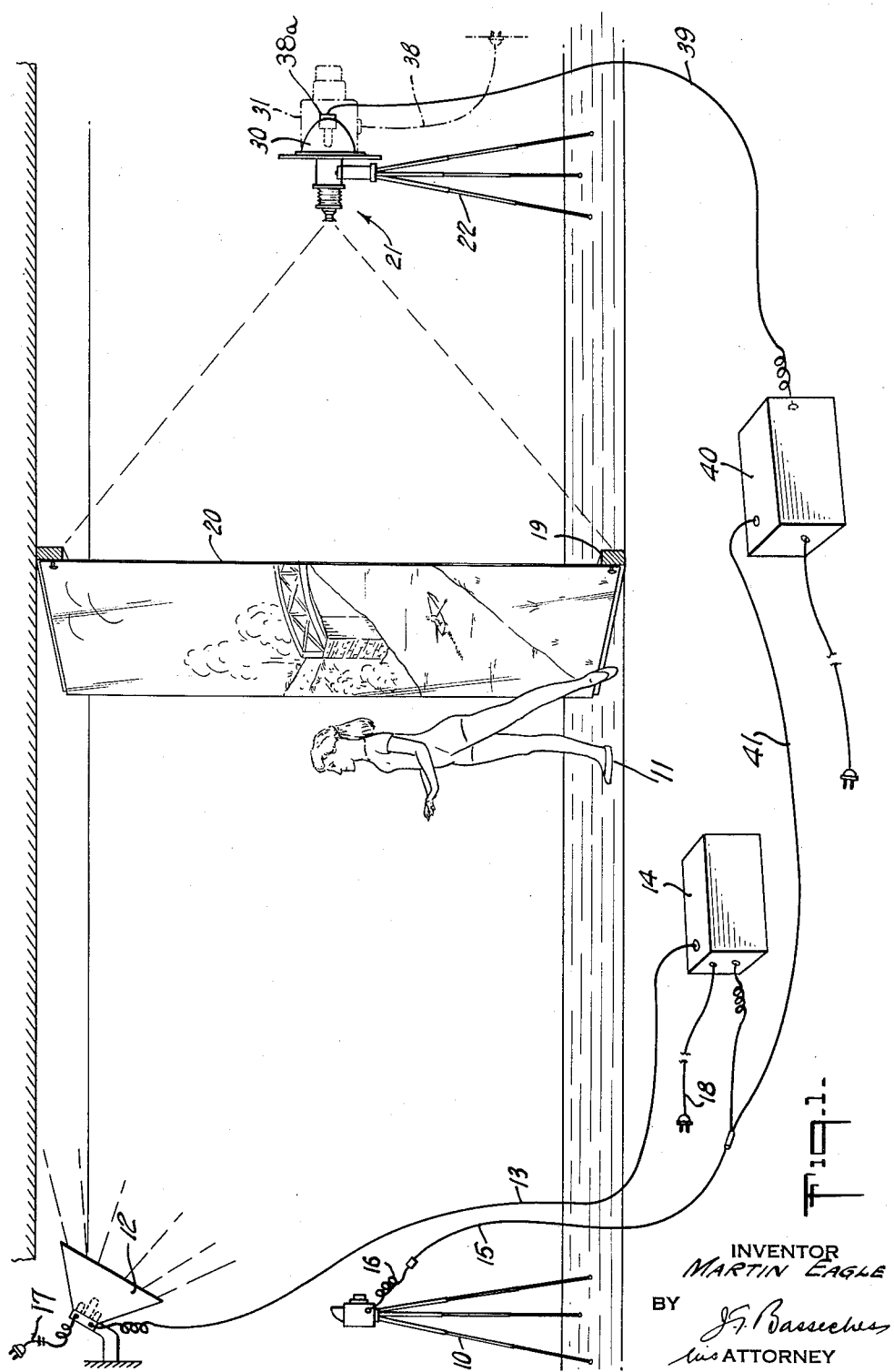
INVENTOR
MARTIN EAGLE
BY
his ATTORNEY June 19, 1962 M. EAGLE 3,039,357
PHOTOGRAPHIC ASSEMBLY AND APPARATUS THEREFOR
Filed March 11, 1957 2 Sheets-Sheet 2
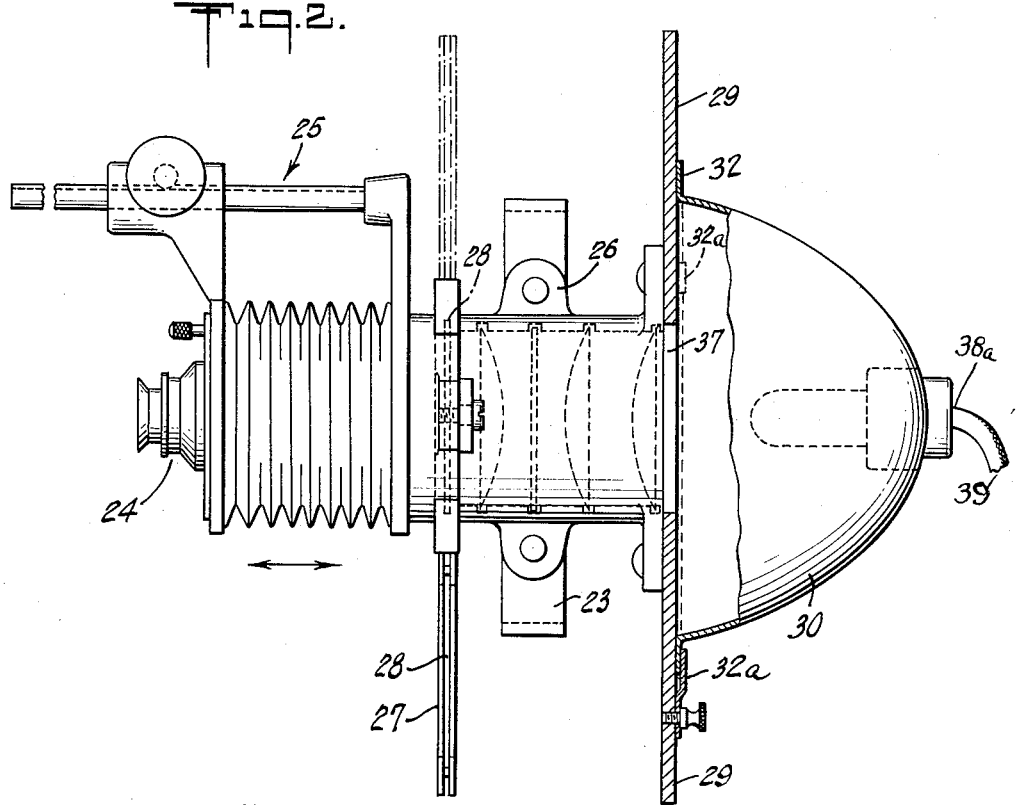
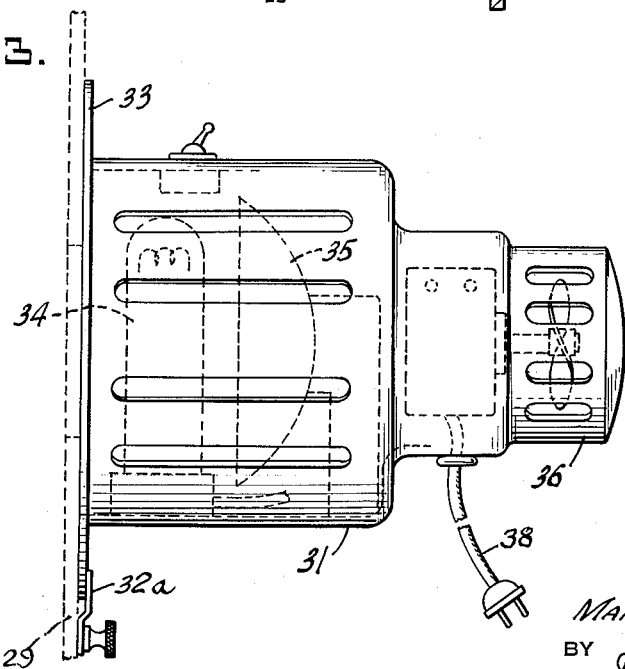
INVENTOR
MARTIN EAGLE
BY
his ATTORNEY

United States Patent Office 3,039,357
Patented June 19, 1962

3,039,357
PHOTOGRAPHIC ASSEMBLY AND APPARATUS
THEREFOR
Martin Eagle, Massapequa, N.Y., assignor to
Manny Eagle, New York, N.Y.
Filed Mar. 11, 1957, Ser. No. 645,337
5 Claims. (Cl. 88—24)

This invention relates to a photographic assembly and apparatus therefor.

My invention is concerned with the solution of problems in making composite photographs, and particularly photographs in the nature of process shots, from which printing plates, half tones, and, more specifically, commercial photographic displays may be made.

The provision of photographic stills by commercial photographers, particularly stills used as advertising media, has been palpably artificial and ineffective when produced in the studio even with uneconomical means and at the great expense involved in furnishing "blow ups" of the background, because of a number of photographic problems which have heretofore escaped attention.

Accordingly, it is an object of my invention to provide a photographic assembly for making composite stills in the studio, with assurance that the composite is carried out effectively, to supply acceptable background effects with adequate realism in relation to the live subjects photographed in the foreground, so that the photographic reproductions are useable for making half-tones, printing and other reproduction media.

Known to me is the practice in commercial photography of making still photographs of live subjects, with artificial backgrounds to represent scenic effects. The projection of these background scenic effects is not only expensive but results in washed-out effects on the films and reproductions, when made by means of stopping the action of a live subject in the foreground.

Particularly ineffectual in forming composites of a live subject and an artificial background is the use of foreground illumination in the nature of electronic flashes or so called "strobe light" illuminants. The effort to stop action of the live subject has had no coordination with the illumination effected upon the background to achieve a composite having any feeling of realism or naturalness, without costly apparatus and laborious procedures.

Accordingly, it is an object of my invention to provide a photographic assembly for making composite stills under studio conditions, photographing live subjects in the foreground and providing inexpensively produced backgrounds, with inexpensive illuminants to carry out the staging effects, to correlate the light values of the foreground to stop action and the background illumination of adequate light value.

In accordance with my invention, it is an object thereof to provide an assembly of camera expedients and electronic flashes as illuminants for the background as obtained by projection from inexpensive transparencies or slides, and by coordinating the duration of projection of the background with the exposure of the live subject, thereby produce in the studio, under economic conditions of equipment, a composite having the attributes of photographic effects produced on the spot, making the production of realistic composite stills commercially feasible.

Still more particularly, it is an object of this invention to provide a photographic assembly and novel apparatus therefor whereby all the benefits of electronic high speed, so called "strobe light" illumination of live objects may be obtained in making composite stills with artificial background scenes projected on screens, thereby avoiding the need for three-dimensional props or photographing on location.

To attain these objects and such further objects as may appear herein or be hereinafter pointed out, I make reference to the accompanying drawing, forming a part hereof, in which—

FIGURE 1 is a diagrammatic view showing a photographic assembly in accordance with my invention;

FIGURE 2 is a magnified view of a projector assembly in accordance with my invention;

FIGURE 3 is a fragmentary sectional view of a removable back illuminant for the installation shown in FIGURE 2.

I now make refernce to the drawing wherein the diagrammatic assembly in FIGURE 1 represents a side elevational view of a studio in which known camera means 10 is positioned in front of a spot 11 where a live subject is to be photographed. Naturalness of reproduction by "stopping" action is intended so that the artificiality of posing under intense lighting conditions may not be necessary. For this purpose there is provided an electronic flash illuminant 12 or electronic flash (more popularly referred to as a strobe light) whereby high intensity with optimum flash duration, for example of from .001 to .0005 second is employed. Such known strobe lights which furnish as much as 400 to 700 watts illumination may be employed, or a combined strobe light and tungsten filament illuminant for posing may be employed.

The strobe light has the usual conductor 13 coupled to the front power pack unit 14 leading to the conductor 15 for the shutter control 16, whereby to secure the instantaneous synchronization of the shutter operation with the strobe flash. Suitable independent sources of power 17 and 18 are provided for the strobe light 12 and the front power unit 14, respectively.

A background frame 19 is provided for supporting a screen 20. In accordance with my invention, this background screen 20 is of translucent sheeting. Translucent sheeting such as Vinylite may be employed, tautened or stretched under conditions eliminating the presence of any medium other than the image which may be projected on the rear face. The translucency may be accomplished by a white opaquing agent, with or without various tinting agents, depending upon the light ray absorption effects which may be found desirable. Red screens, blue and black screens in accordance with the characteristics of the illuminant may be employed under some conditions. A screen of 50% light absorption may be employed, as illustrative of the opacity which I have found desirable in instances.

Rearwardly of the screen 20, there is provided a projector 21, shown as supported on a tripod 22, arranged in the usual manner, to project the image of the background scene upon the rear face of the screen 20. The projector includes a coupling base 23 for connection with the tripod head.

The projector has a lens 24 and rack and pinion or like focus mount 25 forwardly of a condenser and heat ray filter or absorption system 26. A film or slide holder 27 is arranged to mount a slide 28 in the proper optical position between the condenser system and the lens for accurate projection.

Rearwardly of the condenser assembly is a light casing support frame 29 which is arranged with separable clips 32a alternatively to carry the illuminating systems 30 and 31 by interchangeable supports 32 and 33, respectively. The illuminant assembly 31 may carry a high efficiency or nucleated tungsten filament lamp 34, for example of a value of about 500 watts, and a reflector 35, with or without cooling means 36 whereby, when optically aligned to project light through the window 37, the slide 28 is illuminated to project the image of the slide onto the rear face of the screen 20. This arrangement is employed initially properly to focus the slide upon the rear face of the screen and to secure an image thereon. Upon establishing a fixed condition of the projector, the illuminating assembly 31 is replaced by the electronic flash assembly 30, care being exercized to see that the focal point of the illuminant 30 is brought to the same optically effective position as the tungsten filament light 31, which has its own line 38.

The electronic illuminant 30 as described has its own power line 38a and a coupling conductor 39 leading to the rear power unit 40. The rear power unit 40 has a conductor 41 supplied into the line 15, whereby the power units 14 and 40 are wired in parallelism with the shutter control 16 of the camera 10.

The set-up as described will, under actuation of the shutter release to expose the live subject photographically, serve simultaneously to flash the foreground electronic illuminant 12, and the background projector illuminant 30, thereby securing a duration of exposure in the foreground for the live subject to stop action and a duration of exposure on the background screen of comparable magnitude, it being understood that the light values of the electronic flash means may be altered in relation to each other because of the relative distances to the object and screen, respectively.

The coordination of the foreground illuminant employing the electronic flash with a similar source of illumination in the projector serves to provide a background image of intensity and duration making a composite with the FIGURE 11 with such pronounced realism as might be accepted in making composite shots with three-dimensional backgrounds, or making shots on real location.

The projection of the background image with the duration and magnitude of illumination having a close relationship to the foreground illumination as to duration eliminates the problems heretofore experienced in making studio composite shots or process shots in that high intensity and costly illumination need not be employed; the live subject need not be exposed to intense floodlights for the periods of time heretofore found necessary in order to secure proper exposure of the foreground screen; background scenes are not washed out. Other advantages reside in the fact that the unusually high cost of making artificial props is eliminated. Furthermore, the employment of low value illuminants sufficient to prepare the subject immediately before exposure assures all the effecitveness found desirable in electronic flash exposures, to stop live action in a natural and pleasing manner with relationship of the subject to the background, eliminating washed-out and artificial results.

To exemplify the efficiency of the described assembly for indoor studio composite photography, it will be observed that I may provide a projector whose illuminating assembly is a nucleated electronic flash and a parabolic reflector with a three inch focal lens positioned about three inches from a slide of about three and one quarter inches by four inches, to space the projector which I have described approximately within a range of from seven to eight feet rearwardly of the screen, and flood an image approximately ten feet square upon the screen as described, with intensity suitable for making a composite or process shot forwardly of the screen.

It will also be observed that while I have shown and illustrated a translucent screen with a rearwardly positioned projector, it will be understood that the electronically flashed illuminating projector, with its reflector, may be employed, in a measure, with an opaque screen by locating the projector, with suitable corrective measures to give an undistorted image, to project the image on the front face of the screen simultaneously with the operation of the camera shutter for exposure of the foreground subject by the expedients heretofore described.

In the carrying out of my invention I have found it desirable to surround the foreground of the screen 20 by side walls and a ceiling which are of low light reflective value; preferably matt black walls and ceilings are employed, thereby to assure that the background impression on the photographic film of the camera 10 is carried out to the fullest extent by the light source projecting the film on the translucent screen from the rear face thereof.

By my invention, composites may be photographed within relatively small, inexpensively laid-out in-door studios, to secure composite shots in making stills which are highly desirable and are economical in avoiding the necessity for using expensive illumination, and producing photographic impressions capable of accurate production and of a quality comparable to composites taken on location.

By "electronic flash" or "electronically flashed," it is intended to include what is popularly known as a "strobe light" having a flash duration of .001 to .0005 second and an intensity of at least 400 to 700 watts.

Having thus described my invention and illustrated its use, what I claim as new and desire to secure by Letters Patent is:

1. In a photographic assembly for making composite stills in the nature of process shots under studio conditions which includes camera means having a synchronized shutter and electronic flash illumination means for illuminating the foreground of the composite, a background screen of translucent sheeting, projector means including slide holding means for projecting slide transparencies onto the rear face of the screen, the projector including electronic flash illumination having control means synchronized with said foreground illumination.

2. In a photographic assembly for making composite stills in the nature of process shots in indoor studios, which includes a camera set-up having a shutter release and a source of electronic flash illumination therefor under common control means for illuminating the foreground, a translucent screen serving as a background, the combination therewith of a projector with a short focus objective arranged to project onto said screen a scene from a slide transparency to form the background image and to complete the composite picture, said projector having an electronic flash illuminant and coupling for said illuminant to said first control means whereby the duration of exposure of said foreground and screen are substantially of equal magnitude and correlated in intensity of light value.

3. In a photographic assembly for making composite stills in an indoor studio which includes, in combination, a translucent screen serving as a background, surrounded by substantially non-reflective walls, camera means having shutter control means, electronic flash illuminating means, both faced toward said screen to the front face thereof to illuminate the foreground, electrical coupling means to synchronize said camera shutter means and said electronic flash illuminating means, a projector with a short focus objective arranged to project a slide carried image on the rear face of the screen to complete the said composite, means for alternatively mounting a pair of illumination sources for said projector, one of which is electronic, and the other of extended duration, permitting manual focusing of the slide-carried image and control means for said last electronic flash illuminating means under control of said coupling means for instantaneous actuation of said camera shutter and both said electronic flash illuminating means, whereby the duration of exposure from the forwardly and rearwardly directed sources of illumination is synchronized.

4. In a photographic assembly for making composite stills in the nature of process shots which includes, in combination, a translucent screen forming a background for a foreground study shot, camera means having shutter control, electronic flash illuminating means arranged to be directed on the foreground study and faced toward the front face of said screen to illuminate the foreground, control means for said electronic flash illuminating means comprising a power unit coupled for simultaneous control of said electronic flash illuminant and shutter control means of said camera means, a slide projector assembly having means for mounting a slide to form the composite with said foreground study, electronic flash illumination means for projecting said slide through the optical system of said projector onto the rear face of the screen as the background of the composite still, means to control the last mentioned illuminant comprising a power unit coupled to a source of electricity, said last power unit being under the control of the control means of said first illuminating means and shutter control means of the camera whereby the duration of the foreground illumination is of the same magnitude as the background illumination and the image projected on the screen.

5. For use in a photographic assembly for making composite stills in the nature of process shots which includes camera means having shutter control means and electronic flash illumination synchronized with said shutter control means for foreground illumination upon a translucent screen, a projector for single frame slide projection of an image on the rear face of the screen, said projector having an electronic flash source providing a source of illumination for said slide projector, said latter electronic flash having coupling means to synchronize the electronic flash through said projector with the foreground electronic flash illumination coupled with said shutter control means for said foreground.

References Cited in the file of this patent

UNITED STATES PATENTS

| | | |
|---|---|---|
| 2,027,028 | Douden | Jan. 7, 1936 |
| 2,061,652 | Roode | Nov. 24, 1936 |
| 2,244,687 | Goldsmith et al. | June 10, 1941 |
| 2,310,339 | Arndt | Feb. 9, 1943 |
| 2,385,397 | Blackburn | Sept. 25, 1945 |
| 2,478,907 | Edgerton | Aug. 16, 1949 |
| 2,539,228 | Celestin | Jan. 23, 1951 |
| 2,671,377 | Downes et al. | Mar. 9, 1954 |
| 2,708,395 | Wagner et al. | May 17, 1955 |
| 2,797,612 | Holmes | July 2, 1957 |
| 2,844,081 | Wagner et al. | July 22, 1958 |
| 2,895,378 | Budde | July 21, 1959 |